Dec. 10, 1946.  G. F. DALY ET AL  2,412,495
BUBBLE LEVELING DEVICE FOR TRAINING APPARATUS
Filed Dec. 6, 1944
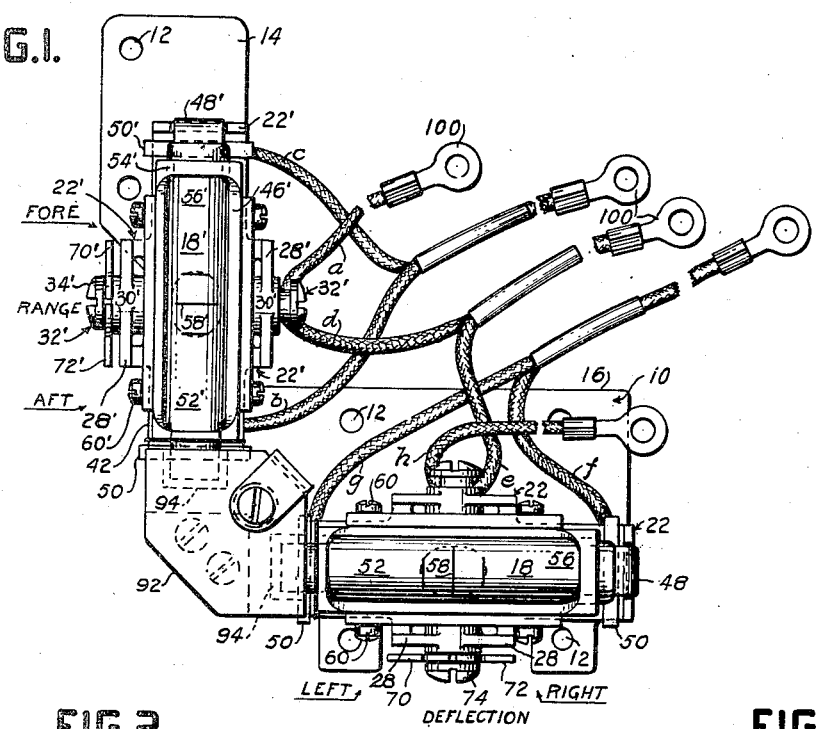
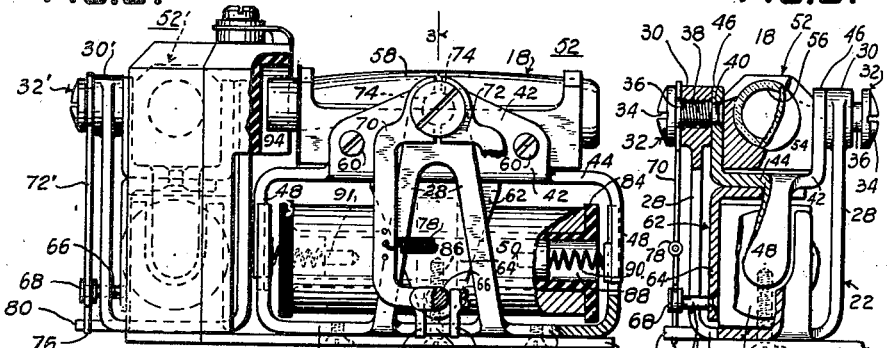
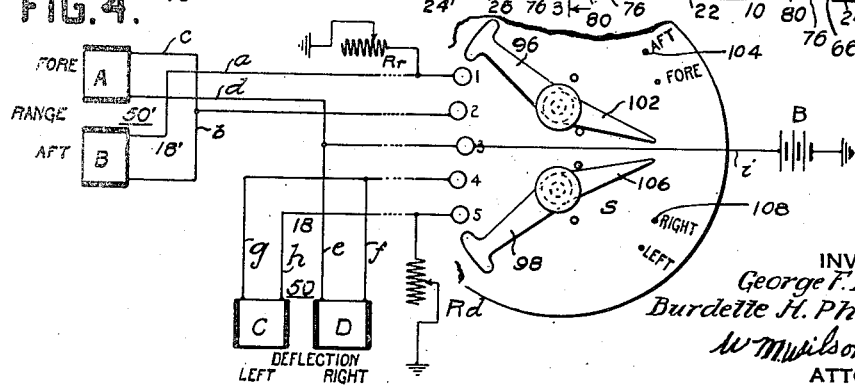
INVENTORS:
George F. Daly,
Burdette H. Phillips.
W. M. Wilson
ATTORNEY Patented Dec. 10, 1946

2,412,495

UNITED STATES PATENT OFFICE 2,412,495

BUBBLE LEVELING DEVICE FOR TRAINING APPARATUS

George F. Daly and Burdette H. Phillips, Endicott, N. Y., assignors to International Business Machines Corporation, New York, N. Y., a corporation of New York Application December 6, 1944, Serial No. 566,805

9 Claims. (Cl. 35—25)

The present invention relates to ground training apparatus for giving primary instruction to pilots, navigators and like aircraft personnel in their respective arts. More specifically, the invention relates to a bubble level control device designed for use in connection with bombardier training apparatus of the type shown in a co-pending application of George F. Daly, Serial No. 566,804, filed December 6, 1944, for Apparatus for training bombardiers and other aircraft personnel. This apparatus has, in the said co-pending application, been illustrated in connection with a conventional Mark XV bombsight. In order to adapt the bombsight for use in the training apparatus, certain additions and modifications, all of which have been disclosed in the above mentioned application, have been resorted to.

Under actual conditions of warfare a bombardier is required to level his bombsight before approaching his target. In training apparatus of the type set forth above, which is a stationary structure, conditions must be introduced to require leveling of the bombsight before each bomb run. This is accomplished at the time of installation of the bombsight stabilizer associated with the training device by installing the present apparatus which has associated therewith a tiltable deflection level bubble and a tiltable range level bubble on the bombsight and providing means whereby the deflection level bubble may be tilted automatically whenever the turn motor under the control of the instructor or bombardier or pilot causes the "plane" to turn and whereby the range level bubble may be tilted whenever an increase or decrease in air speed is effected.

As previously stated, according to the present invention, the deflection level bubble assembly is moved or tilted in one direction or the other each time a turn is made. This is accomplished by means of a solenoid that causes the deflection level bubble assembly to be moved as the turn is made. Similarly, the range level bubble assembly is moved or tilted, by means of a solenoid, whenever an increase or decrease in air speed is effected.

The present invention further contemplates the provision of a means whereby the amount of tilting movement of either the deflection level bubble assembly or the range level bubble assembly may be controlled to accommodate different degrees of turn and different degrees of increase or decrease in air speed, as the case may be.

The specific means whereby the bubble level control device is actuated from the turn motor associated with the training device or from the mechanism which indicates an increase or decrease in air speed forms no part of the present invention and reference may be had to the above mentioned co-pending application for a full disclosure of this mechanism. The present invention is concerned primarily with the mechanical and electrical construction of the bubble level control device and purely for illustrative purposes a manually controlled actuating switch for operating the same has been disclosed. By means of such a switch, the deflection level bubble assembly and range level bubble assembly, or both, may be tilted in one direction or the other at will and the degree of tilting movement of either assembly may selectively be controlled.

The provision of an apparatus of the character set forth above being the principal object of the present invention, an additional object thereof is to provide such a mechanism which is extremely compact in its design and which will occupy a minimum of space on the bombsight assembly without requiring substantial modification of the latter.

Another object of the invention is to provide a bubble level mechanism of this type having associated therewith a bubble centering device by means of which, after actuation of either the deflection bubble level assembly or the range bubble level assembly the same is quickly and accurately restored to its neutral or horizontal position.

Yet another object of the invention is to provide a novel form of electrical control means for the deflection level bubble and range level bubble whereby the control solenoids associated therewith remain normally energized and whereby selective tilting movement of the bubble assemblies may be effected by partial shorting of one or the other, or both, of these solenoids.

The provision of an apparatus of this type which is comprised of a minimum number of moving parts and which, consequently, is unlikely to get out of order, one which may be manufactured inexpensively and one which is well adapted to perform the services required of it are further desirable features that have been borne in mind in the development of the invention.

Other objects and advantages of the invention not at this time enumerated will become more readily apparent as the nature of the invention is better understood.

In the accompanying single sheet of drawings forming a part of this specification:

Fig. 1 is a top plan view of a bubble level control apparatus constructed in accordance with the principles of the present invention.

Fig. 2 is a side elevational view thereof, partly in section.

Fig. 3 is a sectional view taken substantially along the line 3—3 of Fig. 2.

Fig. 4 is an electrical circuit diagram showing a manually controlled switch for actuating the apparatus.

In all of the above described views like characters of reference are employed to designate like parts throughout.

Referring now to the drawing in detail, the apparatus involves in its general organization a base plate 10 having formed therein a series of apertures 12 for the reception of screws or the like, by means of which the entire assembly may be installed on the bombsight assembly.

The base plate 10 is generally of L-shaped configuration and includes a relatively narrow, outwardly projecting, elongated arm 14 and a somewhat shorter and wider arm 16 extending at right angles to the arm 14 and integrally formed therewith. The shape of the base plate 10, including its arms 14 and 16, has nothing to do with the present invention, the shape being adapted to accommodate the structural features of the bombsight mechanism associated with the trainer. A pair of bubble level assemblies are designated in their entirety at 18 and 18' respectively, the assembly 18 constituting a deflection level bubble assembly and the assembly 18' constituting a range level bubble assembly, these assemblies being so labeled on the drawing. The two assemblies just mentioned are substantially identical in their construction and it is thought that a description of one will suffice for them both. In order that the single description about to be set forth may be applied to both assemblies, in the drawing similar characters of reference are employed to like parts in the two assemblies.

Each bubble level assembly includes a stationary bracket 22 having a bottom member 24 which rests flush upon the base plate 10 and which is secured thereto by means of studs 26 or the like having countersunk heads. Each bracket 22 is provided with a pair of standards 28 at the sides thereof which terminate at their upper ends in a hollow boss 30 through which there is threadedly received a stud 32. Each stud 32 includes a slotted head 34, an enlarged shank portion 36, a reduced threaded portion 38 and a still further reduced portion 40. The enlarged shank portion 36 affords a shoulder for limiting the extent of tilting engagement between the stud 32 and boss 30 whereby the slotted head 34 is maintained spaced from the outside of the boss 30.

The reduced portions 40 of the two studs 32 serve as pivotal points or trunnions for supporting therebetween a bubble level cradle 42. The cradle 42 includes a base portion 44, a pair of upstanding sides 46 and a pair of depending armature portions 48, which latter portions are designed for cooperation with a dual core solenoid 50, the nature and function of which will be set forth presently.

The two sides 46 of the cradle 42 receive therebetween a bubble level assembly per se 52 including a bubble level housing 54, a transparent bubble tube 56 which is adapted to be partially filled with a suitable liquid, such as glycerine or the like, and on which there are provided indicia marks 58 which serve as reference points for centering the bubble invariably associated with such assemblies. A plurality of studs 60 (Figs. 1 and 2) extend through the sides 46 of the cradle 42 and serve to anchor the bubble assembly in position within the cradle.

The cradle 42 has secured to its underneath side in any suitable manner, as for example by spot welding or the like, an L-shaped bracket 62 having a downwardly depending arm 64 which extends to a point adjacent the bottom of the bracket 22 and which is provided at its bottom with a laterally and outwardly extending pin 66 near the outer end of which there is formed a pair of guide members 68. A pair of cooperating equalizing levers 70 and 72 respectively are provided with arcuate bearing surfaces 74 at their upper ends and with foot portions 76 at their lower ends, the two foot portions 76 being adapted to be received between the two guide members 68 and to bear against the body portion of the pin 66 between these two members when the cradle 42 is in its normal or level position. A tension coil spring 78 is connected at its opposite ends to the equalizing levers 70 and 72 medially thereof and serves to draw both of these members together so that the two foot portions 76 bear against the opposite sides of the pin 66 with equal pressure. A stopping ear 80 projects outwardly from one side of the bottom member 24 of the bracket 22 and is adapted to be engaged by the foot portions 76 of the equalizing levers 70 and 72 when the cradle 42 is in its level position.

It is to be noted that the width of the stopping ear 80 and of that portion of the pin 66 existing between the guide member 68 are of equal width so that the tendency of the equalizing levers 70 and 72 is to draw the pin 66 into vertical alignment with the stopping ear 80 in a central position and when such a condition of alignment exists the cradle 42, and consequently the bubble level assembly 52, is level with respect to the horizontal.

The previously mentioned solenoid 50 includes a spool shaped core 84 which is held in position by means of countersunk studs 86 that project through apertures in the base plate 10. The ends of the core 84 are recessed as at 88 and each of the recesses 88 has disposed therein a relatively light coil spring 90, one end of which is secured as at 91 to the bottom of the recess 88 and the other end of which projects outwardly a slight distance beyond the edge of the spool shaped core 84 and is adapted to bear against the inner side of one of the armatures 48 when the latter is retracted. These latter coil springs 90 are provided in order that different degrees of tilting movement may be imparted to the cradle 42 in a manner and for a purpose to be set forth presently.

A block 92 which is formed of a suitable insulating material, such as Bakelite or the like, projects upwardly from the base plate 10 adjacent the juncture between the arms 14 and 16 thereof and is provided with a pair of recesses 94 affording a clearance for the adjacent ends of the bubble level assemblies 52 and 52'. The insulating block 92 is provided for a purpose that is not associated with this application.

Referring now to Figs. 1 and 4, the solenoid 50' which controls the tilting movement of the range level bubble assembly is comprised of two separate windings A and B respectively, the former winding being labeled "Fore" and the latter winding being labeled "Aft." Similarly, the solenoid 50 which controls the tilting movement of the deflection level bubble assembly is comprised of separate windings C and D which have been labeled "Left" and "Right" respectively. The various windings of the two solenoids 50 and 50' are operatively connected to a manual control switch S by means of which selective tilting movement of the two bubble assemblies may be resorted to.

The switch S is of the dual rotary type and includes five contacts labeled 1, 2, 3, 4 and 5 respectively. The various contacts of the switch S are adapted to be electrically connected by means of a series of wires to the opposite ends of the individual windings of the two solenoids 50 and 50' in a manner that will now be clearly set forth. The various wires just referred to are provided with terminals 100 (Fig. 1), which terminals are designed for connection to the contacts 1, 2, 3, 4 and 5 of the switch S and are labeled accordingly.

The contacts 1 and 2 are electrically connected to the opposite ends of the winding B by means of wires a and b. The contacts 2 and 3 are electrically connected to opposite ends of the winding A by means of wires c and d. The contacts 3 and 4 are electrically connected to the opposite ends of the winding D by means of wires e and f, and the contacts 4 and 5 are electrically connected to the opposite ends of the winding C by means of wires g and h. According to the present invention, it is contemplated that electrical current issuing from a battery B or other source be passed at all times through the various windings A, B, C and D of the solenoids 50 and 50' simultaneously. Current leaving the battery B passes through a wire i to the contact 3 and from thence through wire d, winding A, wire c, contact 2, wire b, winding B, wire a, contact 1, and from thence through an adjustable rheostat Rr to ground. The current from the batery B also passes through wires i and e, winding D, wire f, contact 4, wire g, winding C, wire h, contact 5 and from thence through rheostat Rd to ground. It will be seen, therefore, that the current divides at the contact 3 and one-half of it flows through the solenoid 50', while the other half thereof flows through the solenoid 50.

The switch S includes a pair of independent rotary contact arms 96 and 98 respectively, the arm 96 accommodating the range bubble level solenoid 50' and the arm 98 accommodating the deflection level bubble solenoid 50. From the above description it will be seen that when the contacts 1 and 2 are shorted by the rotary arm 96 a direct shunt is placed across the winding B of the solenoid 50' and one-half of the battery voltage will flow through the winding A through wires d and c, thus attracting the armature 48' at the front of the solenoid 50' and causing the bubble level assembly 52' to tilt forwardly. Similarly, when this same arm is placed across the contacts 2 and 3 a direct shunt is effected across the winding A so that a portion of the battery voltage flown through the winding B through wires b and a to attract the armature 48' at the rear end of the solenoid 50' to tilt the bubble level assembly 52' rearwardly.

When the arm 98 is placed across the contacts 3 and 4, a direct shunt occurs across the winding D of the solenoid 50 which controls tilting movement of the deflection level bubble assembly. The winding C is thus rendered effective to cause the bubble level assembly 52 to tilt to the left. When this same arm is placed across the contacts 4 and 5 a direct shunt exists across the winding C and the winding D becomes effective to tilt the bubble level assembly 52 to the right.

The contact arm 96 is provided with a pointer 102 designed for selective registry with a pair of indicia marks 104 labeled "Fore" and "Aft" respectively, which pointer and marks are provided for reference purposes in setting of the arm 96. Similarly, the arm 98 is provided with a pointer 106 designed for selective registry with indicia marks 108 labeled "Right" and "Left," this latter pointer and indicia marks affording reference positions for the arm 98.

The rheostat Rr is provided for the purpose of controlling the amount of current which flows through either the winding A or B of the range level bubble assembly 18' so that these windings may exert different degrees of magnetic attraction upon their respective armatures 48'. Similarly, the rheostat Rd is provided to control the flow of current through the winding C and D of the deflection level bubble assembly 18 to control the degree of tilting movement thereof. Because of the provision of the springs 90 at the opposite ends of the two solenoids, partial tilting movement of the two bubble level assemblies is made possible, depending upon the adjustments of the two rheostats. Thus fairly accurate control of the tilting movements of these bubble level assemblies may be attained, depending upon the degree of turning movement of the plane or upon the degree of increase or decrease in air speed, as the case may be.

While there have been shown and described and pointed out the fundamental novel features of the invention as applied to this illustrated embodiment, it will be understood that various omissions and substitutions and changes in the form and details of the device illustrated and in its operation may be made by those skilled in the art, without departing from the spirit of the invention. It is the intention, therefore, to be limited only as indicated by the prior art and the scope of the following claims.

What is claimed is:

1. In an apparatus of the character described, a tiltable bubble level assembly movable from a tilted position in one direction through a center or level position to a tilted position in another direction, a pair of armatures carried by said assembly, an electromagnet for each armature operable upon energization thereof to move the latter and tilt the assembly in one direction or the other, and means for selectively energizing said armatures.

2. In an apparatus of the character described, a tiltable bubble level assembly movable from a tilted positioned in one direction through a center or level position to a tilted position in another direction, a pair of armatures carried by said assembly, an electromagnet for each armature, means normally maintaining said armatures out of engagement with said electromagnets, each electromagnet being capable when energized of attracting its respective armature thereto to cause tilting movement of the assembly in one direction or the other, said electromagnets being opposed to each other in exerting a pulling effect upon the bubble level assembly through their respective armatures, means for simultaneously passing electric current through said armatures, and means for selectively by-passing current around either armature at will to cause the other armature to become operative.

3. In an apparatus of the character described, a tiltable bubble level assembly movable from one extreme tilted position through a center or level position to another extreme tilted position, a pair of armatures carried by said assembly and arranged in spaced relationship, an electromagnet for each armature, said electromagnets being disposed between said armatures and adapted to exert pulling influences thereon in opposite directions when simultaneously energized, means normally energizing said electromagnets simultaneously, and means for selectively shunting either electromagnet at will to allow the other electromagnet to become operative.

4. In an apparatus of the character described, a bubble level assembly mounted for tilting movement about a horizontal axis extending in one direction from one extreme position to another through a center or level position, a second bubble level assembly likewise mounted for tilting movement about a horizontal axis extending at right angles to said first mentioned axis from one extreme position to another through a center or level position, spring means normally urging each of said assemblies toward its center or level position, an electromagnet for each assembly having two windings, an armature for each winding carried by its respective assembly and capable upon energization thereof of being attracted to its respective armature to tilt the assembly associated therewith in one direction or the other from its level position, and means for selectively energizing said windings.

5. In an apparatus of the character described, a bubble level assembly mounted for tilting movement about a horizontal axis extending in one direction from one extreme position to another through a center or level position, a second bubble level assembly likewise mounted for tilting movement about a horizontal axis extending at right angles to said first mentioned axis from one extreme position to another, an electromagnet for each assembly having two windings, an armature for each winding carried on its respective bubble level assembly and capable upon energization of the winding of being attracted to its respective armature, and means for selectively energizing said windings.

6. In an apparatus of the character described, a tiltable cradle, a bubble level assembly mounted on said cradle and bodily movable therewith, said cradle being movable from one extreme tilted position through an intermediate position wherein the bubble level assembly is level to another extreme tilted position, spring means normally urging said cradle to a position wherein said assembly is level, and an electromagnet operable upon energization thereof to move the assembly from its level position, and means for energizing said electromagnet.

7. In an apparatus of the character described, a tiltable cradle, a bubble level assembly carried by said cradle and bodily movable therewith, said cradle being movable from one extreme tilted position through a center position wherein the bubble level assembly is level to another extreme tilted position, a pair of trunnions for said cradle and on which the latter is tiltably mounted, a pair of equalizing arms carried by said trunnions and depending downwardly therefrom, a foot portion on each trunnion, an arm depending from said cradle, a pin extending laterally from said arm and projecting between said foot portions, spring means normally urging said arms toward each other whereby the foot portions carried thereby are normally maintained in engagement with said pin.

8. In an apparatus of the character described, a tiltable cradle, a bubble level assembly carried by said cradle and bodily movable therewith, said cradle being movable from one extreme tilted position through a center position wherein the bubble level assembly is level to another extreme tilted position, a pair of trunnions for said cradle and on which the latter is tiltably mounted, a pair of equalizing arms carried by said trunnions and depending downwardly therefrom, a foot portion on each trunnion, an arm depending from said cradle, a pin extending laterally from said arm and projecting between said foot portions, spring means normally urging said arms toward each other whereby the foot portions carried thereby are normally maintained in engagement with said pin, and a stationary stopping ear also projecting between said foot portions for determining the center positon of said cradle.

9. In an apparatus of the character described, a base plate, a pair of standards projecting upwardly from said base plate, a pair of trunnions carried by said standards, a cradle tiltably mounted on said trunnions, a bubble level assembly mounted on said cradle and movable bodily therewith, said cradle being tiltable from one extreme position through a center position wherein the bubble level assembly carried thereby is level to another extreme tilted position, a pair of equalizing arms tiltably supported on one of said trunnions and depending downwardly therefrom to points adjacent said base plate, each trunnion being provided with a foot portion at its lower end, an arm mounted on said cradle and depending therefrom, a pin projecting laterally from said arm and projecting between said foot portions, spring means normally urging said equalizing arms toward each other whereby the foot portions carried thereby are normally urged into engagement with said pin, a stopping ear on said base plate also projecting laterally between said foot portions and determining the center position of said cradle, a pair of armatures depending from said cradle at opposite ends thereof, a double-ended electromagnet disposed between said armatures positioned between said armatures and normally spaced therefrom when the cradle is in its center position, said electromagnet including a pair of windings, one for each armature, operable upon energization thereof to exert an inward pulling effect on the latter, spring means carried by said electromagnet normally urging said armatures away from the electromagnet, an electric circuit for said windings, said windings being disposed in the circuit in series, means normally energizing said circuit, and a switch disposed in said circuit for selectively shunting either winding from the circuit.

GEORGE F. DALY.
BURDETTE H. PHILLIPS.